United States Patent
Drinkwater et al.

(10) Patent No.: US 10,057,698 B2
(45) Date of Patent: Aug. 21, 2018

(54) MULTIPLE ROOM COMMUNICATION SYSTEM AND METHOD

(71) Applicant: Bose Corporation, Framingham, MA (US)

(72) Inventors: Don L. Drinkwater, Carlisle, MA (US); Naganagouda B. Patil, Ashland, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/255,472

(22) Filed: Sep. 2, 2016

(65) Prior Publication Data

US 2018/0070187 A1    Mar. 8, 2018

(51) Int. Cl.
*H04R 27/00* (2006.01)
*G06F 3/16* (2006.01)

(52) U.S. Cl.
CPC ............ *H04R 27/00* (2013.01); *G06F 3/165* (2013.01); *G06F 3/167* (2013.01); *H04R 2227/003* (2013.01); *H04R 2227/005* (2013.01)

(58) Field of Classification Search
CPC ............... H04R 227/005; H04R 3/005; H04R 2227/003; H04R 2227/005
USPC ............................. 381/91–92, 77, 79–80, 82
See application file for complete search history.

(56) References Cited

U.S. PATENT DOCUMENTS

| | | | |
|---|---|---|---|
| 7,525,440 B2 | 4/2009 | Carreras et al. | |
| 8,234,395 B2 * | 7/2012 | Millington | H04J 3/0664 709/205 |
| 9,078,072 B2 | 7/2015 | Sundaresan et al. | |
| 9,438,193 B2 * | 9/2016 | Dizon | H03G 3/3005 |
| 9,516,441 B2 * | 12/2016 | Reilly | G06F 3/017 |
| 9,641,947 B2 * | 5/2017 | Loether | H04R 27/00 |
| 2003/0023741 A1 | 1/2003 | Tomassetti et al. | |
| 2008/0075295 A1 * | 3/2008 | Mayman | G06F 1/1632 381/79 |
| 2008/0134102 A1 * | 6/2008 | Movold | G06F 3/017 715/863 |
| 2009/0047993 A1 * | 2/2009 | Vasa | G11B 27/105 455/556.1 |
| 2011/0044468 A1 | 2/2011 | Braithwaite et al. | |
| 2013/0317635 A1 | 11/2013 | Bates et al. | |

(Continued)

OTHER PUBLICATIONS

U.S. Appl. No. 15/087,021, filed Mar. 31, 2016 entitled "Clock Synchronization for Audio Playback Devices" applicant Bose Corporation.

(Continued)

*Primary Examiner* — Disler Paul
(74) *Attorney, Agent, or Firm* — Brian M. Dingman; Dingman IP Law, PC

(57) ABSTRACT

A method for operating a wireless audio playback device that has an electro-acoustic transducer and a microphone, wherein the wireless audio playback device is configured for playback of audio signals received from a plurality of digital audio sources and for synchronized audio playback with one or more other wireless audio playback devices. A particular predefined user action is detected. Based on the detection, wireless communication with another wireless audio playback device is enabled. Then an audio signal received by the device microphone is transmitted to and played by the other wireless audio playback device.

9 Claims, 5 Drawing Sheets

(56) References Cited

U.S. PATENT DOCUMENTS

| | | |
|---|---|---|
| 2014/0277651 A1 | 9/2014 | Gomes-Casseres et al. |
| 2015/0051723 A1* | 2/2015 | Bates ..................... H04R 27/00 |
| | | 700/94 |
| 2016/0105753 A1* | 4/2016 | Reilly ..................... G06F 3/017 |
| | | 381/81 |

OTHER PUBLICATIONS

The International Search Report and The Written Opinion of the International Searching Authority dated Oct. 11, 2017 for PCT Application No. PCT/US2017/049659.

* cited by examiner

MULTIPLE ROOM COMMUNICATION SYSTEM AND METHOD

BACKGROUND

This disclosure relates to multi-room communication using wireless audio playback devices.

Wireless audio playback devices such as wireless loudspeakers can by synchronized such that the same audio can be played on more than one device. When multiple devices are in multiple locations, such as different rooms in a home, the listening experience will not change as a listener moves between rooms.

SUMMARY

All examples and features mentioned below can be combined in any technically possible way.

In one aspect, a method for operating a wireless audio playback device that has an electro-acoustic transducer and a microphone, wherein the wireless audio playback device is configured for playback of audio signals received from a plurality of digital audio sources and for synchronized audio playback with one or more other wireless audio playback devices, includes detecting a particular predefined user action, based on the detection of the particular predefined user action establishing wireless communication with another wireless audio playback device, and then transmitting to the other wireless audio playback device an audio signal received by the microphone.

Embodiments may include one of the following features, or any combination thereof. The method may further include, after transmitting, receiving from the other wireless audio playback device an audio signal that was received by a microphone of the other wireless audio playback device. The audio signal that was received by the microphone of the other wireless audio playback device may be a speech signal. The wireless audio playback device may be located in one room and the other wireless audio playback device may be located in a different room. The wireless audio playback device may have a user interface with user interface elements such as push buttons that can be associated with the digital audio sources and are operated in one manner so as to connect the wireless audio playback device with a digital audio source, and the particular predefined user action may include a particular operation of a push button that differs from the one manner of operation. The particular predefined user action may alternatively be operation of a portable computing device. The particular predefined user action may alternatively be providing a voice command that is interpreted by the wireless audio playback device.

Embodiments may include one of the following features, or any combination thereof. The wireless audio playback device may be synchronized for audio playback with at least two other wireless audio playback devices, and establishing wireless communication with another wireless audio playback device may include selecting one of the other wireless audio playback devices to communicate with. The wireless audio playback device may include a user interface and the particular predefined user action may include operation of the user interface. The user interface may include user interface elements such as push buttons that can be associated with the digital audio sources and are operated in one manner so as to connect the wireless audio playback device with a digital audio source, and the particular predefined user action may be a particular operation of a push button that differs from the one manner of operation. The one or more other wireless audio playback devices may be wireless headphones. The method may further include playing the transmitted audio signal on the other audio playback device, but only after a person takes an action to accept the communication from the audio playback device. The action to accept the communication from the audio playback device may be a button push or a voice command.

In another aspect, a method for operating a wireless audio playback device that has an electro-acoustic transducer, a microphone, and a user interface with user interface elements that comprise push buttons that can be associated with the digital audio sources and are operated in one manner so as to connect the wireless audio playback device with a digital audio source, wherein the wireless audio playback device is configured for playback of audio signals received from a plurality of digital audio sources and for synchronized audio playback with one or more other wireless audio playback devices, includes detecting a particular predefined user action that comprises a particular operation of a push button that differs from the one manner of operation, based on the detection of the particular predefined user action establishing wireless communication with another wireless audio playback device, transmitting to the other wireless audio playback device an audio signal received by the microphone, and receiving from the other wireless audio playback device a speech signal that was received by a microphone of the other wireless audio playback device. The wireless audio playback device may be synchronized for audio playback with at least two other wireless audio playback devices, and establishing wireless communication with another wireless audio playback device may include selecting one of the other wireless audio playback devices to communicate with.

In another aspect, a wireless audio playback device that is configured for playback of audio signals received from a plurality of digital audio sources, and is further configured for synchronized audio playback with one or more other wireless audio playback devices, includes an electro-acoustic transducer, a microphone, a user interface that includes a plurality of user-operable interface elements, and a processor coupled to the electro-acoustic transducer, the microphone and the user interface. The processor is configured to receive an input from the user interface based on a particular user operation of an interface element, and in response establish a communication channel with another wireless audio playback device, and then arrange for transmission to the other wireless audio playback device over the communication channel of audio input that was received by the microphone.

Embodiments may include one of the following features, or any combination thereof. The user interface elements may include push buttons that can be associated with the digital audio sources and are operated in one manner so as to connect the wireless audio playback device with a digital audio source, and the particular user operation may be a particular operation of the push buttons that differs from the one manner of operation. The particular operation of the push buttons may be a double push of a button within a predetermined time. The processor may be further configured to receive from the other wireless audio playback device an audio signal that was received by a microphone of the other wireless audio playback device. The audio signal that was received by the microphone of the other wireless audio playback device may be a speech signal.

DETAILED DESCRIPTION

Audio playback devices that are configured to wirelessly connect to multiple sources of digital audio and to each other, and that have an electro-acoustic transducer and a microphone, are used to accomplish multiple room communication (intercom-like) functionality. The wireless audio playback devices are configured for playback of audio signals received from a plurality of digital audio sources and for synchronized audio playback with one or more other wireless audio playback devices. A particular predefined user action (e.g., a button press) is detected. Based on the detection, wireless communication with another wireless audio playback device is enabled. Then an audio signal received by the sending device microphone is transmitted to and played by the other (receiving) wireless audio playback device. For bilateral communication, the receiving device is enabled to detect speech for a short time afterward, to allow the recipient to communicate back to the sender. Bilateral communication can also be enabled to continue for a desired time, for example until it is ended by either user.

Figure 1:
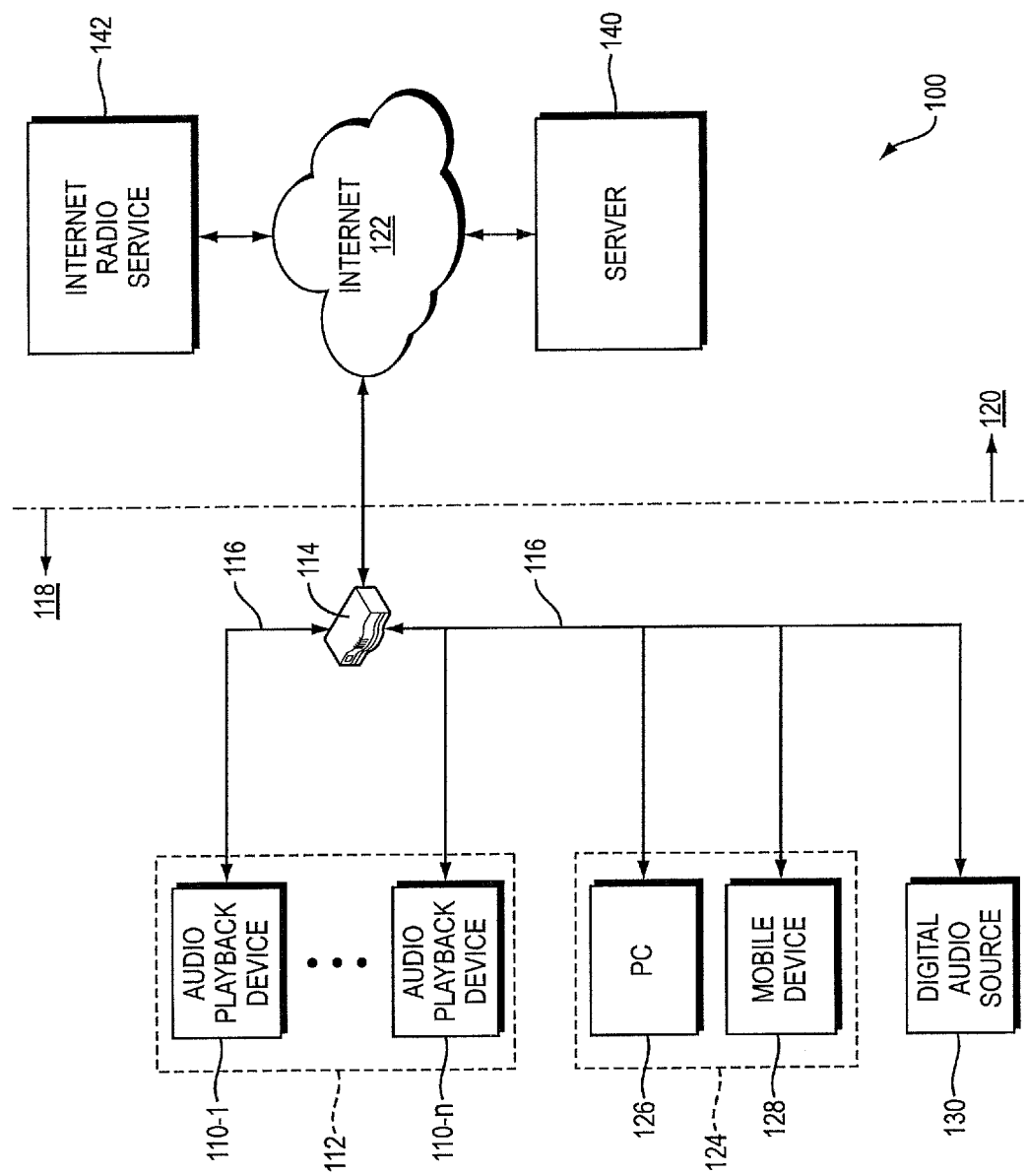
FIG. 1 is schematic block diagram of an audio distribution system that includes wireless audio playback devices.

Audio distribution system 100, FIG. 1, can be used to accomplish a multiple room communication system and method. System 100 also includes wireless audio playback devices that can be involved in the subject multiple room communication system and method. System 100 is adapted to deliver (i.e., play) digital audio (e.g., digital music). System 100 includes a number of audio playback devices 110-1-110-n (collectively referenced as 110), which may (or may not be) among a zone of audio output devices 112 of the system. In one non-limiting embodiment, the audio playback devices are identical devices that each include a digital to analog converter that is able to receive digital audio signals and convert them to analog form. The audio playback devices also include an electro-acoustic transducer that receives the analog audio signals and transduces them into sound. The audio playback devices also include a processor. The audio playback devices are connected to one another and also connected to the router/access point 114 via network 116. The audio playback devices are thus able to communicate with one another. Network 116 can be a wired and/or wireless network, and can use known network connectivity methodologies. Network 116 is part of LAN 118 which is connected to wide area network (WAN) 120, in this non-limiting example by connection to Internet 122. LAN 118 also includes one or more separate computing devices 124 and one or more separate local digital audio sources 130. In this non-limiting example the computing devices include a personal computer 126 and a mobile computing device 128 such as a smartphone, tablet or the like. WAN 120 includes server 140 and Internet radio service 142 which can both communicate with the LAN via Internet 122. For situations in which the inter-device communications referenced herein are between devices in separate locations (e.g., separate households), there may be a second LAN (not shown) that communicates with LAN 118 through WAN 120.

One use of system 100 is to play digital audio data, including but not limited to an audio stream, over one or more of the audio playback devices in zone 112. The sources of digital audio provide access to content such as audio streams that move over network 116 to the audio playback devices. The sources of such audio streams can include, for example, Internet radio stations and user defined playlists. Each of such digital audio sources maintains a repository of audio content which can be chosen by the user to be played over one or more of the audio playback devices. Such digital audio sources can include Internet-based music services such as Pandora®, Spotify® and vTuner®, for example. Network attached storage devices such as digital audio source 130, and media server applications such as may be found on a mobile computing device, can also be sources of audio data. In a non-limiting example, the user selects the audio source and the playback devices via PC 126 and/or mobile device 128.

When a user has chosen to have an audio stream played on more than one of the audio playback devices, in order for the music to be properly synchronized such that the same tracks are playing synchronously on all of the audio playback devices there needs to be appropriate and sufficient coordination among all of the active audio playback devices. One manner in which such coordination can be accomplished is to use one of the audio playback devices to control the distribution of audio data to all of the other active audio playback devices that are being used to play content. This device which controls audio data distribution to the other active playback devices can be considered a master device, and the rest of the active devices (i.e., the rest of the playback devices that are being used to play content) can be considered to be slave devices. In addition to an audio stream, the master device also provides control data (e.g., via a control data stream) to at least some of the slave devices. The control data includes timing information which enables the slave devices to synchronize playback of the streamed audio content with the master device. In one example, the control data includes a "play at" time, which corresponds to a time when the playback devices are to begin playback of the streamed audio data. Devices joining the playback group after playback has started may also use the "play at" time to determine where in the stream to begin playback in order to sync up with the playback devices in the group.

To help ensure that the playback of the audio content is and remains synchronized, the respective internal clocks of the individual playback devices are synchronized. In principle, such clocks comprise an oscillator and a counter. Clock synchronization of audio playback devices is further described in application Ser. No. 15/087,021, filed on Mar. 31, 2016, the entire disclosure of which is incorporated herein by reference.

In an existing multi-device system, such as disclosed in U.S. Pat. No. 9,078,072, the disclosure of which is incorporated herein by reference, when one or more playback devices are added to an already playing playback device, the result is the formation of a multi-device zone which is managed by the playback device that was initially playing the audio. All of the playback devices are clock synchronized. The audio data that gets distributed to the playback devices are time-stamped, and due to clock synchronization the audio is played synchronously at all playback devices. The manager of the zone is the master device, and its main functions are audio control and audio distribution. The remaining device(s) in the zone are referred to as slaves. The device which is responsible for the clock synchronization is called the clock master. The clock master is part of the same network as all the other speakers, but may or may not be part of the same zone. In some cases the clock master can be the same as the master device, but it need not be.

The main roles of the audio master are audio distribution to and audio control of the slaves. The audio master establishes secure connections to each of the slaves in the zone. This connection may or may not be over the home router or access point, and the connection between each slave and the master may or may not be unique (i.e., the connection can be unicast or multicast). Time-stamped audio packets are then distributed over each of these connections to the individual slaves. The slaves use the time-stamps to play audio at the correct time. Apart from an audio distribution channel, there is also a control channel which is established between the audio master and the slave devices. The control channel is used to send out audio control messages. When playback is requested at the audio master, the audio master starts buffering the data before starting playback. During this time audio is also distributed to the slaves through the audio distribution channel.

Figure 2:
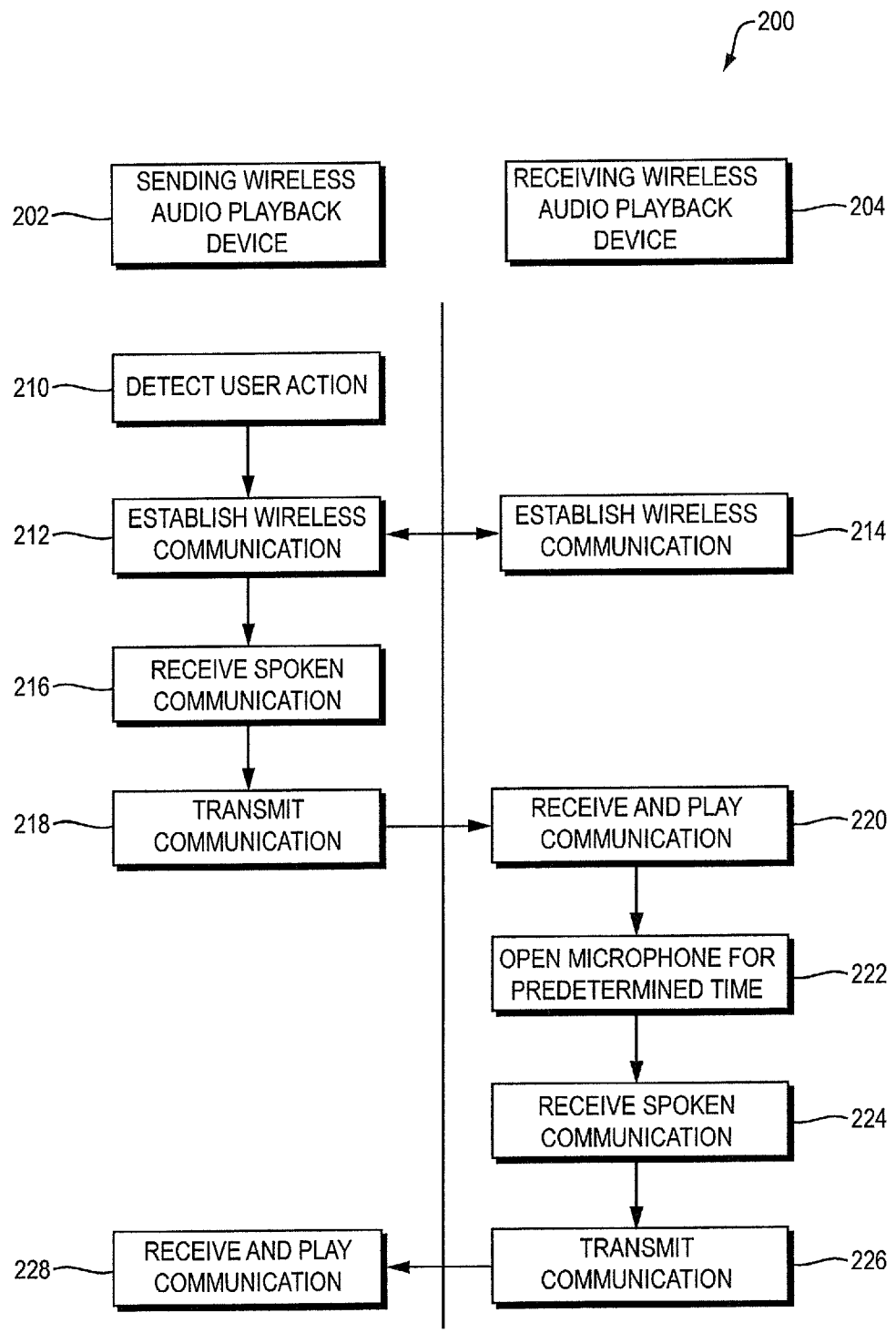
FIG. 2 is a swim lane diagram illustrating steps of one example of using two audio playback devices of FIG. 1 for inter-room voice communication.

Referring to FIG. 2, two swim lanes are shown in swim-lane diagram 200, including a lane that relates to the sending wireless audio playback device 202 and a lane that relates to the receiving wireless audio playback device 204. At step 210, sending device 202 detects a particular predefined user action that will result in voice communication from device 202 to device 204, or potentially both ways between devices 202 and 204.

In one non-limiting example devices 202 and 204 each have several buttons that can each be associated with a source of digital audio, as further explained below. When a button is pushed the assigned audio source begins playing through the device. If multiple devices are synchronized, the same audio is played synchronously through each of the synchronized devices.

In this example, the particular predefined user action can be a double push of one of these buttons, within a specified time period. Each device could be assigned to one button. For example, if there are six buttons numbered 1-6, one device can be assigned to button 1 and a second device can be assigned to button 2, and so forth. If the devices are located in different locations (such as different rooms in a home or office, or different physical locations, potentially anywhere in the world that has wireless access), this assignment will equate to the location. For example, device 1 could be in the kitchen of the home and device 2 in a child's bedroom.

There are myriad other possible predefined particular user actions that can begin an intercom-type functionality. For example, the action could be another predefined use of the user interface (UI) of the wireless audio playback device (e.g., press and hold a button), or a predefined particular use of the user interface of a smartphone app that controls device 202 and/or that controls a system comprising two or more wireless audio playback devices. The UIs of the devices could have dedicated real or virtual intercom buttons, and the UI of the app could have dedicated virtual intercom buttons. Another option is to enable the wireless audio playback devices for voice recognition using established technology, and allow the user to issue voice commands to the device.

Upon detection at device 202 of the particular predefined user action (e.g., a double button push), wireless communication is established between device 202 and device 204, steps 212 and 214. If either device is playing music during any inter-device communication, the music volume can automatically be decreased or shut off. The open communication channel allows audio picked up by the microphone of device 202 to be sent to device 204. In the case where the devices are part of an interconnected group of devices, each device of the group is already able to communicate with each other device over WiFi. Following the example above, when button number 2 on device 1 is double pressed, device 1 will be enabled to communicate with device 2 over WiFi. Communication could be accomplished in any other technically feasible manner as now known in the art, or as developed in the future.

At step 216, device 202 then receives spoken communication, and at steps 218 and 220 the received sound is transmitted to and received and played by device 204. Thus, devices 202 and 204 act like intercoms, where direct unilateral or bilateral communication between two devices is accomplished. The digitized voice audio packets sent from device 202 to device 204 could include identification of the sending device, to allow the sending device identification to be displayed on the display of the recipient device. For example, "message from kitchen" could be displayed on device 204.

In one non-limiting example, once inter-device communication has been established, the microphone of the sending device 202 is activated. The activation can be only for a specified, relatively short time, such as ten or fifteen seconds. This time can be pre-established, or could be set be the user. User control could be via a user interface of the wireless audio playback device and/or a smartphone app, for example. The time should be sufficient to allow a user to speak, but not so long as to leave open a communication channel that was mistakenly opened. One reason is that a result of the connection is that sound in the room in which device 202 is located will be played by device 204 and thus will be heard in the room where device 204 is located. This happens without any input by any person who is within earshot of device 204. If the communication channel was opened mistakenly, it would be advantageous to close the channel fairly quickly, so as not to disturb people in the room where device 204 is located. Another option would be to leave the microphone active for as long as the user is talking, and perhaps for a few seconds after speech input stops to allow the user to pause briefly then continue talking.

An option not shown in FIG. 2 allows the recipient to screen incoming message before it is played. The recipient can be allowed to (or required to) accept an incoming message before it is played. This can be accomplished in any manner as accommodated by the audio playback devices used in the communication. In non-limiting examples of such acceptance, the recipient could be notified of an incoming message, such as with a tone played by the receiving device. The recipient could "accept" the message through a predefined action such as a button push or a voice command (e.g., "I accept"). Another option would be to allow the recipient to deny or block a message, again by a predetermined action such as a button push or a voice command.

An optional aspect set forth in FIG. 2 allows for bilateral communications. Once device 204 receives and plays sound sensed by the microphone of device 202, the microphone of receiving device 204 is opened for a predetermined (typically short) time, step 222. This allows a person near device 204 to respond to what the person heard as communicated by the person speaking at device 202. The microphone open time can be preset, or set by the user in a manner such as described above. The microphone open time is typically perhaps 10-15 seconds, to give the recipient time to reply to the sender. If device 204 receives audio during this mic open time, step 224, it is transmitted to and received by and played by device 202, steps 226 and 228. Another option would be to leave the receiving device microphone active for as long as the user is talking, and perhaps for a few seconds after speech input stops to allow the user to pause briefly then continue talking.

As an illustration, a parent in the kitchen where device 202 is located may want to let a child in the room where device 204 is located know that dinner is ready. The parent would double press button #2 twice in quick succession, and then say "dinner is ready." The child would hear this played through device 204, and could respond, perhaps to say "be right there." Another option would be to associate each device with the name of the person whose room the device is in. If the child is named Susan, device #2 could be associated with Susan. Or the device could be associated with a room, say the family room. Such association could be accomplished on device setup, using the device UI or the smartphone app. Then the parent could say "tell Susan dinner is ready" and device 202 would recognize Susan's name and find the device associated with Susan, and interpret "tell Susan" as a command to open communications with device 204 and then transmit the words following the command, i.e., "dinner is ready."

In another option in the bilateral communication case, the communication channel between the devices can remain open until it is closed by either user. In one case, communication can remain open while the appropriate button is held down, or until it is ended by another predetermined use of the device UI such as the press of a predefined button, or by use of predefined functionality of a smartphone app.

Another option would be to use devices in a similar fashion to baby monitors, where one device is used to listen to sound in the room where a second device is located. In this case, once wireless inter-device communications were established, the microphone of the "receiving" device 204 would be enabled and the channel would remain open for an extended period (typically until it was actively closed by some predefined user action). The microphone of device 202 could be disabled so that sound in the room where device 202 is located was not played by device 204.

Figure 3A:
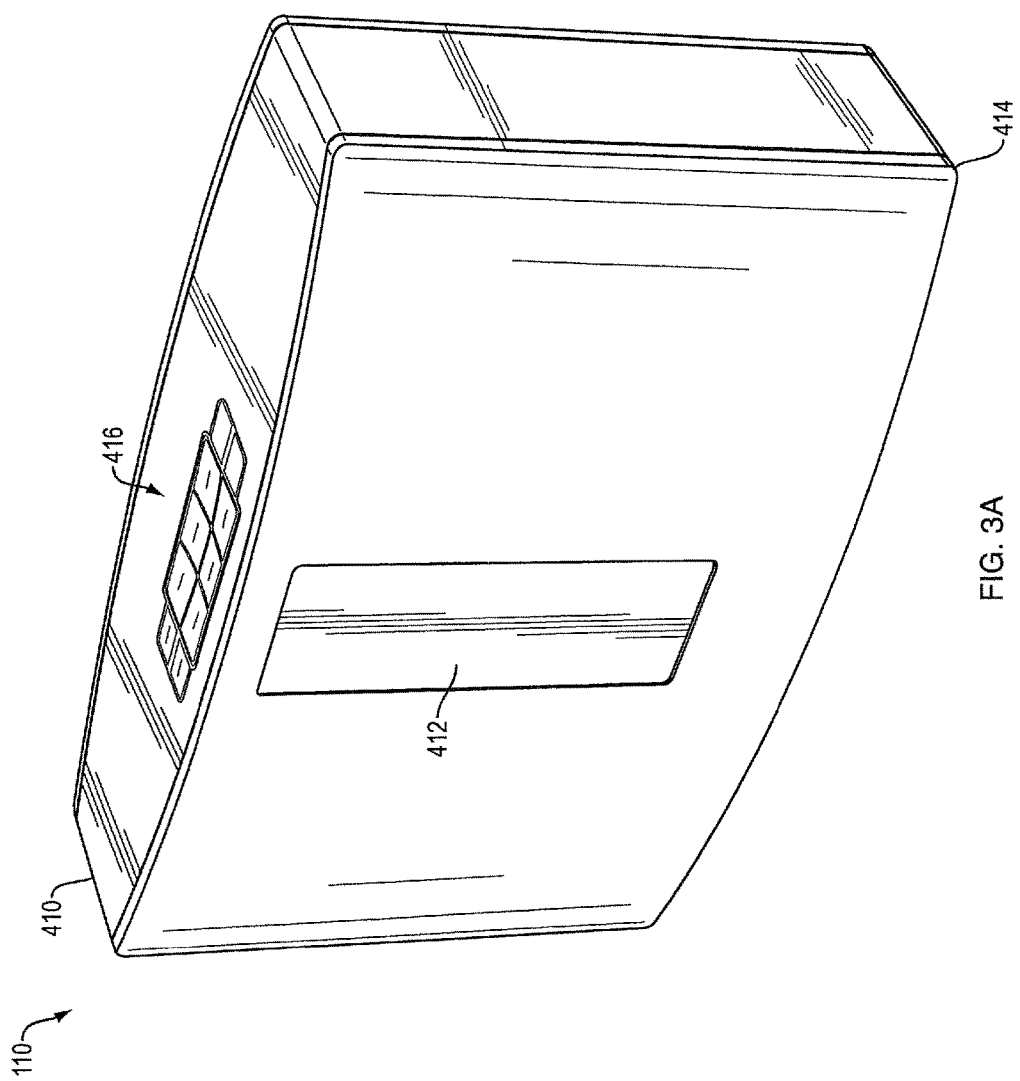
FIGS. 3A and 3B are perspective and top plan views, respectively, of an exemplary audio playback device of the audio system of FIG. 1.
Figure 3B:
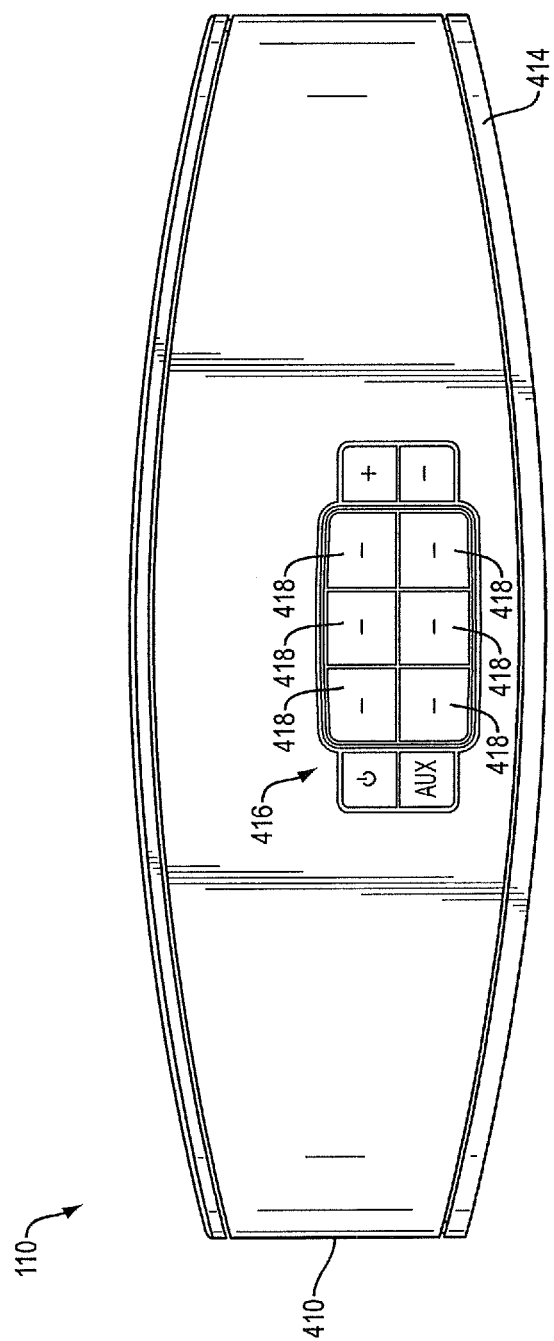
Figure 3C:
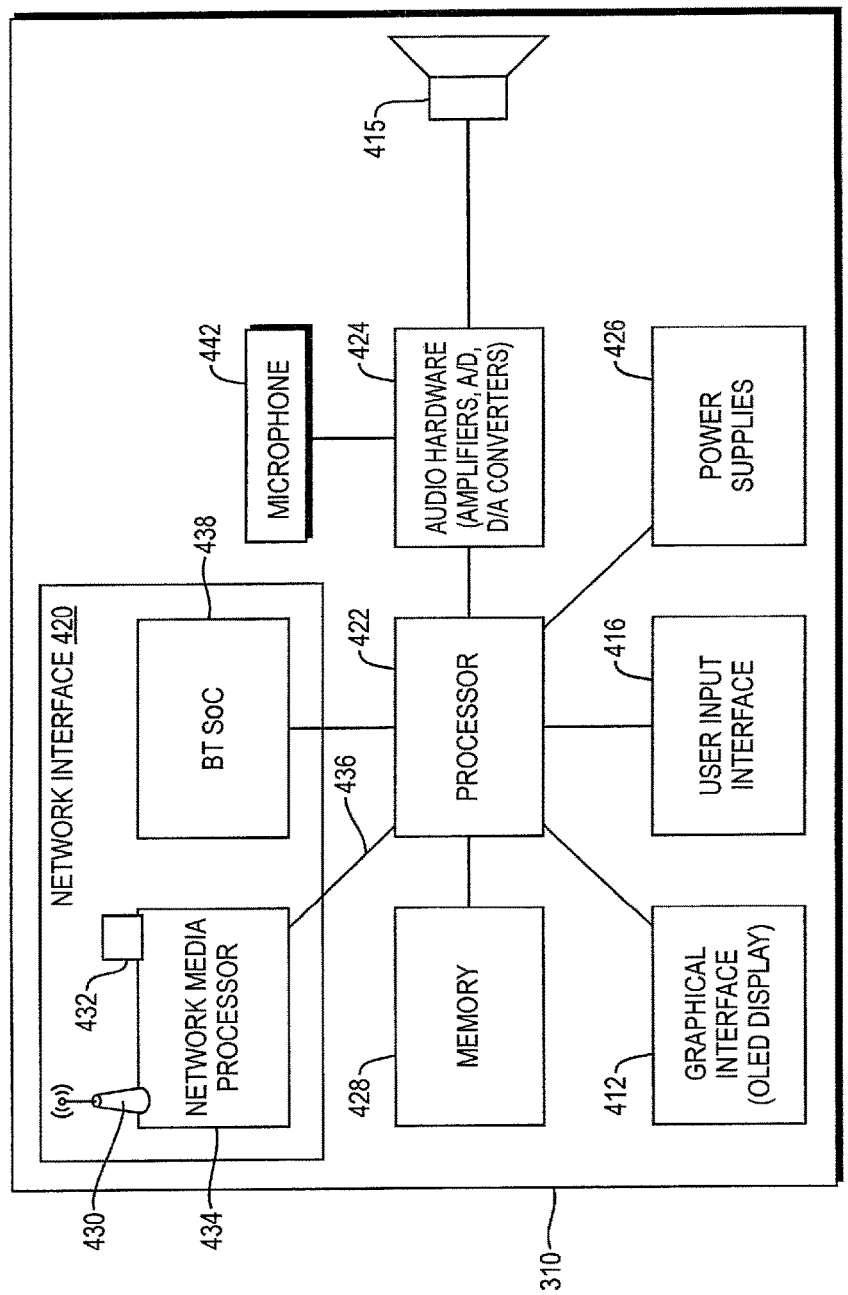
FIG. 3C is a block diagram of the audio playback device of FIGS. 3A and 3B.

An exemplary wireless audio playback device 110 will now be described in greater detail with reference to FIGS. 3A through 3C. Referring to FIG. 3A, a wireless audio playback device 110 includes an enclosure 410 and on the enclosure 410 there resides a graphical interface 412 (e.g., an organic light emitting diode (OLED) display) which can provide the user with information regarding currently playing ("Now Playing") music, information regarding the presets, and other information such as described above. A screen 414 conceals one or more electro-acoustic transducers 415 (FIG. 3C). The audio playback device 110 also includes a user input interface 416. As shown in FIG. 3B, the user input interface 416 includes a plurality of preset indicators 418, which are hardware buttons in the illustrated example. The preset indicators 418 (numbered 1-6) provide the user with easy, one press access to digital audio sources or entities assigned to those buttons, and potentially to the intercom function as described above. That is, a single press of a selected one of the preset indicators 418 will initiate streaming and rendering of content from the assigned entity.

The assigned entities can be associated with different ones of the digital audio sources such that a single audio playback device 110 can provide for single press access to various different digital audio sources. In one example, the assigned entities include at least (i) user-defined playlists of digital music and (ii) Internet radio stations. In another example, the digital audio sources include a plurality of Internet radio sites, and the assigned entities include individual radio stations provided by those Internet radio sites.

Notably, the preset indicators 418 operate in the same manner, at least from a user's perspective, regardless of which entities are assigned and which of the digital audio sources provide the assigned entities. That is, each preset indicator 418 can provide for single press access to its assigned entity whether that entity is a user-defined playlist of digital music provided by an NAS device or an Internet radio station provided by an Internet music service.

With reference to FIG. 3C, the audio playback device 110 also includes a network interface 420, a processor 422, audio hardware 424, power supplies 426 for powering the various audio playback device components, and memory 428. Each of the processor 422, the graphical interface 412, the network interface 420, the processor 422, the audio hardware 424, the power supplies 426, and the memory 428 are interconnected using various buses, and several of the components may be mounted on a common motherboard or in other manners as appropriate.

The network interface 420 provides for communication between the audio playback device 110, the remote server (item 140, FIG. 1), the audio sources and other audio playback devices 110 via one or more communications protocols. The network interface 420 may provide either or both of a wireless interface 430 and a wired interface 432. The wireless interface 430 allows the audio playback device 110 to communicate wirelessly with other devices in accordance with a communication protocol such as such as IEEE 802.11b/g. The wired interface 432 provides network interface functions via a wired (e.g., Ethernet) connection.

In some cases, the network interface 420 may also include a network media processor 434 for supporting Apple AirPlay® (a proprietary protocol stack/suite developed by Apple Inc., with headquarters in Cupertino, Calif., that allows wireless streaming of audio, video, and photos, together with related metadata between devices). For example, if a user connects an AirPlay® enabled device, such as an iPhone or iPad device, to the LAN 118, the user can then stream music to the network connected audio playback devices 110 via Apple AirPlay. A suitable network media processor is the DM870 processor available from SMSC of Hauppauge, N.Y. The network media processor 434 provides network access (i.e., the Wi-Fi network and/or Ethernet connection can be provided through the network media processor 434) and AirPlay® audio. AirPlay® audio signals are passed to the processor 422, using the I2S protocol (an electrical serial bus interface standard used for connecting digital audio devices), for downstream processing and playback. Notably, the audio playback device 110 can support audio-streaming via AirPlay® and/or DLNA's UPnP protocols, and all integrated within one device.

All other digital audio coming from network packets comes straight from the network media processor 434 through a USB bridge 436 to the processor 422 and runs into the decoders, DSP, and eventually is played back (rendered) via the electro-acoustic transducer(s) 415.

The network interface 420 can also include a Bluetooth (BT) system-on-chip (SoC) 438 for Bluetooth applications (e.g., for wireless communication with a Bluetooth enabled controller (not shown)). Suitable BT SoC products are well known in the field and so are not further described herein.

Streamed data pass from the network interface 420 to the processor 422. The processor 422 can execute instructions within the audio playback device (e.g., for performing, among other things, digital signal processing, decoding, and equalization functions), including instructions stored in the memory 428. The processor 422 may be implemented as a chipset of chips that include separate and multiple analog and digital processors. The processor 422 may provide, for example, for coordination of other components of the audio playback device 110, such as control of user interfaces, applications run by the audio playback device 110. A suitable processor is the DA921 available from Texas Instruments. Processor 422 can also be enabled to accomplish the intercom functionality described herein.

The processor 422 provides a processed digital audio signal to the audio hardware 424 which includes one or more digital-to-analog (D/A) converters for converting the digital audio signal to an analog audio signal. The audio hardware 424 also includes one or more amplifiers which provide amplified analog audio signals to the electroacoustic transducer(s) 415 for playback. In addition, the audio hardware 424 may include circuitry for processing analog input signals to provide digital audio signals for sharing with other devices in the acoustic system 100. Audio signals such as spoken words are received by microphone 442. After appropriate processing (such as analog to digital conversion, not shown), audio input is provided to processor 422.

The memory 428 may include, for example, flash memory and/or non-volatile random access memory (NVRAM). In some implementations, instructions (e.g., software) are stored in memory 428. The instructions, when executed by one or more processing devices (e.g., the processor 422), perform one or more processes, such as those described above (e.g., with respect to FIG. 3). The instructions can also be stored by one or more storage devices, such as one or more computer- or machine-readable mediums (for example, the memory 428, or memory on the processor). The instructions may include instructions for performing decoding (i.e., the software modules include the audio codecs for decoding the digital audio streams), as well as digital signal processing and equalization.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other implementations are within the scope of the following claims.

For example, the concepts described above work not only with dedicated speaker packages, such as illustrated in FIGS. 3A-3C, but also with other wireless audio playback devices that are enabled for wireless communication (e.g., using Bluetooth and/or WiFi) and have a loudspeaker, a microphone and a processor. There are many devices having these functionalities that could be programmed to accomplish the present methods. One example of a stand-alone wireless audio playback device that can be used is the SoundTouch® wireless system available from Bose Corporation of Framingham, Mass. USA. Another example is the SoundLink® wireless headphones available from Bose Corporation. Stereo systems with wireless functionality can also be used in the methods.

What is claimed is:

1. A system, comprising:
first and second wireless audio playback devices that are each configured for playback of audio signals received from a plurality of digital audio sources and for synchronized audio playback with one or more other wireless audio playback devices, each of the first and second wireless audio playback devices comprising:
an electro-acoustic transducer;
a user interface comprising a user-operable button;
a microphone that is configured to detect speech;
a wireless network interface that provides for wireless communication with another wireless audio playback device; and
a processor that is configured to execute instructions that cause the wireless audio playback device to:
detect a single operation of the button and in response automatically connect with a particular audio source, such that the particular audio source begins playing on the electro-acoustic transducer;
while the wireless audio playback device is playing the particular audio source, detect a double operation of the button, and in response stop playing the particular audio source and establish a wireless local area network communication channel with the other wireless audio playback device;
after establishing a wireless local area network communication channel with the other wireless audio playback device, wirelessly transmit to the other wireless audio playback device, over the wireless local area network communication channel, speech detected by the microphone; and then receive from the other wireless audio playback device over the wireless local area network communication channel speech that was detected by the microphone of the other wireless audio playback device; and then play the received speech using the electro-acoustic transducer.

2. The system of claim 1, wherein the processor of each audio playback device is further configured to play speech received from another audio playback device, but only after a person takes an action to accept the wireless transmission of the speech.

3. The system of claim 2, wherein the action to accept the wireless transmission of the speech comprises a button push or a voice command.

4. The wireless audio playback device of claim 1, wherein the microphone of the other wireless audio playback device is enabled to detect speech only for a predetermined amount of time after the wireless transmission to the second wireless audio playback device of speech detected by the microphone of the first wireless audio playback device.

5. The wireless audio playback device of claim 1, wherein the processor is further configured to execute instructions that cause the wireless audio playback device to, after establishing a wireless local area network communication channel with the other wireless audio playback device, wirelessly transmit to the other wireless audio playback device over the wireless local area network communication channel and along with the speech detected by the microphone, an identification of the wireless audio playback device, and wherein, in response, the other wireless audio playback device displays the wireless audio playback device identification.

6. The wireless audio playback device of claim 1, wherein the processor is further configured to execute instructions that cause the wireless audio playback device to, after receiving speech from the other wireless audio playback device, allow a user to screen the received speech before it is played, where the screening comprises a button push or a voice command.

7. The wireless audio playback device of claim 1, wherein the processor is further configured to execute instructions that cause the wireless audio playback device to, after receiving and playing the speech from the other wireless audio playback device, activate the microphone so it is configured to detect speech, where the activation is only for a predetermined short time, or the activation is as long as speech is detected and for a short time thereafter.

8. The wireless audio playback device of claim 1, wherein the processor is further configured to execute instructions that cause the wireless audio playback device to associate the wireless audio playback device with the name of a person, and wherein the processor is still further configured to execute instructions that cause the wireless audio playback device to recognize the name of the person associated with another wireless audio playback device, and then find the other wireless audio playback device that is associated with the person's name, and only then open a communication channel with the other wireless audio playback device that is associated with the person's name.

9. A system, comprising:
first and second wireless audio playback devices that are each configured for playback of audio signals received from a plurality of digital audio sources and for synchronized audio playback with one or more other wireless audio playback devices, each of the first and second wireless audio playback devices comprising:
an electro-acoustic transducer;
a user interface comprising a user-operable button;
a microphone that is configured to detect speech;
a wireless network interface that provides for wireless communication with another wireless audio playback device; and
a processor that is configured to execute instructions that cause the wireless audio playback device to:
detect a single operation of the button and in response automatically connect with a particular audio source, such that the particular audio source begins playing on the electro-acoustic transducer;
while the wireless audio playback device is playing the particular audio source, detect a double operation of the button, and in response stop playing the particular audio source and establish a wireless local area network communication channel with the other wireless audio playback device;
associate the wireless audio playback device with the name of a person, and wherein the processor is still further configured to execute instructions that cause the wireless audio playback device to recognize the name of the person associated with another wireless audio playback device, and then find the other wireless audio playback device that is associated with the person's name, and only then open a communication channel with the other wireless audio playback device that is associated with the person's name;
after establishing a wireless local area network communication channel with the other wireless audio playback device, wirelessly transmit to the other wireless audio playback device, over the wireless local area network communication channel, speech detected by the microphone; and then
wirelessly transmit to the other wireless audio playback device over the wireless local area network communication channel and along with the speech detected by the microphone, an identification of the wireless audio playback device, and wherein, in response, the other wireless audio playback device displays the wireless audio playback device identification;
receive from the other wireless audio playback device, over the wireless local area network communication channel, speech that was detected by the microphone of the other wireless audio playback device; and then
allow a user to screen the received speech before it is played, where the screening comprises a button push or a voice command; and then
play the received speech using the electro-acoustic transducer; and then
after playing the speech, activate the microphone so it is configured to detect speech, where the activation is only for a predetermined short time, or the activation is as long as speech is detected and for a short time thereafter.

* * * * *